United States Patent
Dubois

(12) 
(10) Patent No.: US 7,934,653 B2
(45) Date of Patent: May 3, 2011

(54) REINFORCING DEVICE FOR SLOT CARD READER

(75) Inventor: Eric Dubois, Montvendre (FR)

(73) Assignee: Ingenico France, Neuilly sur Seine (FR)

( * ) Notice: Subject to any disclaimer, the term of this patent is extended or adjusted under 35 U.S.C. 154(b) by 762 days.

(21) Appl. No.: 11/663,471

(22) PCT Filed: Sep. 23, 2005

(86) PCT No.: PCT/FR2005/050774
§ 371 (c)(1), (2), (4) Date: Nov. 29, 2007

(87) PCT Pub. No.: WO2006/032825
PCT Pub. Date: Mar. 30, 2006

(65) Prior Publication Data
US 2008/0245866 A1    Oct. 9, 2008

(30) Foreign Application Priority Data
Sep. 23, 2004 (FR) ..................... 04 52136

(51) Int. Cl.
*G06K 7/08* (2006.01)

(52) U.S. Cl. ...................... 235/449; 235/441
(58) Field of Classification Search ............... 235/441, 235/449, 380, 375
See application file for complete search history.

(56) References Cited

U.S. PATENT DOCUMENTS

| 5,065,001 A | 11/1991 | Hennick et al. |
| 5,331,139 A | 7/1994 | Lee |
| 6,540,560 B1 * | 4/2003 | Ito et al. ................ 439/633 |

OTHER PUBLICATIONS

Search Report dated Nov. 1, 2006 from related application PCT/FR2005/050774.

* cited by examiner

*Primary Examiner* — Karl D Frech
(74) *Attorney, Agent, or Firm* — Howard IP Law Group, PC

(57) ABSTRACT

A device for strengthening a card reader including a slot at least partly delimited by a base and two lateral walls and extending along a longitudinal direction, the slot being intended to receive a card moving along the longitudinal direction while bearing on the base, the device including a wire of substantially circular cross-section arranged at the level of the base and on which the card is intended to slide.

15 Claims, 1 Drawing Sheet

US 7,934,653 B2

REINFORCING DEVICE FOR SLOT CARD READER

This application claims the benefit of French Application No. 04/52136, filed Sep. 23, 2004 and Int'l. Application No. PCT/FR2005/050774, filed Sep. 23, 2005, the entire disclosures of which are incorporated herein by reference.

FIELD OF THE INVENTION

The present invention relates to a device for strengthening a swipe reader. More specifically, the present invention relates to a device for strengthening a swipe reader, of magnetic or optical reader type, in which the swiping of a card in the reader slot is performed manually or in motorized fashion.

DISCUSSION OF THE RELATED ART

FIG. 1 schematically shows a conventional example of a magnetic or optical card reader 10. Reader 10 comprises a lateral slot 12 in which a user can swipe a card (not shown). Slot 12 is delimited by a lateral edge 14 of reader 10 and by the body of reader 16. Reader 10 comprises a read head (not shown) capable of reading data stored on the card. It may be a magnetic read head capable of reading data stored in the form of a magnetic strip arranged on the card. It may also be an optical read head capable of reading data stored in the form of a bar code formed on the card.

FIG. 2 schematically shows lateral edge 14 of reader 10 of FIG. 1 which is formed of a lateral flange 17, which delimits a side of slot 12, and of a base 18 which delimits the bottom of slot 12. The side of slot 12 opposite to flange 17 is delimited by a part or several parts of reader 10; not shown. Edge 14 is generally formed of a plastic material enabling manufacturing of edge 14 at low cost.

To improve the sliding of cards in slot 12 and avoid a fast wearing of base 18 on successive swipings of cards in slot 12, base 18 is covered with a strengthening strip 20 on which cards are swiped. Strengthening strip 20 is generally formed of a wear-resisting low friction coefficient material, for example, steel. Such a strengthening strip 20 is generally formed by an overmolding operation performed on base 18. Such a method is however relatively complex and of non-negligible cost.

U.S. Pat. No. 5,065,001, ceased to Welch Allyn Company, describes a swipe reader in which the strengthening strip is formed of a planar strip cut and maintained in grooves provided at the slot level. The position of the strengthening strip in the slot may be adjusted by providing several parallel grooves, which enables using the reader for cards of different dimensions.

To surely guide the displacement of a card in the slot, it may be desirable to provide a slot 12 having a non perfectly planar median surface but exhibiting a slight curvature along the longitudinal slot direction. The card then temporarily is slightly deformed on swiping thereof in the slot, which ensures a correct alignment of the card with respect to the read head.

In this case, the use of a joined strengthening strip is difficult. Indeed, it is then necessary to provide specific cutting operations to obtain a strengthening strip having its longitudinal sides following the slot curvature.

SUMMARY OF THE INVENTION

The present invention aims at providing a device for strengthening the bottom of a swipe reader slot that can indifferently adapt to card readers comprising a rectilinear or slightly curved slot.

Another object of the present invention is to provide a swipe reader strengthening device of simple assembly.

Another object of the present invention is to provide a swipe reader strengthening device of simple design.

To achieve these objects, the present invention provides a device for strengthening a card reader comprising a slot at least partly delimited by a base and two lateral walls and extending along a longitudinal direction, said slot being intended to receive a card moving along said longitudinal direction while bearing on the base. The device comprises a wire of substantially circular cross-section arranged at the level of the base and on which the card is intended to slide.

According to an embodiment of the present invention, the lateral walls of the slot exhibit a curvature with respect to an axis perpendicular to said base.

According to an embodiment of the present invention, the diameter of the wire is substantially equal to the width of the slot.

According to an embodiment of the present invention, before being arranged, the wire exhibits a curvature with respect to an axis transverse to the slot.

According to an embodiment of the present invention, the wire comprises two inclined ends and the base comprises two notches receiving said inclined ends.

According to an embodiment of the present invention, each notch comprises at least one tapered surface to ease the introduction and/or the maintaining in said notch of the associated inclined end.

The present invention aims at a card reader comprising a slot at least partly delimited by a base and two lateral walls and extending along a longitudinal direction, said slot being intended to receive a card moving along said longitudinal direction while bearing on the base, the reader comprising a strengthening device such as previously described.

BRIEF DESCRIPTION OF THE DRAWINGS

The foregoing object, features, and advantages of the present invention, as well as others, will be discussed in detail in the following non-limiting description of specific embodiments in connection with the accompanying drawings, in which.

DETAILED DESCRIPTION

Figure 1:
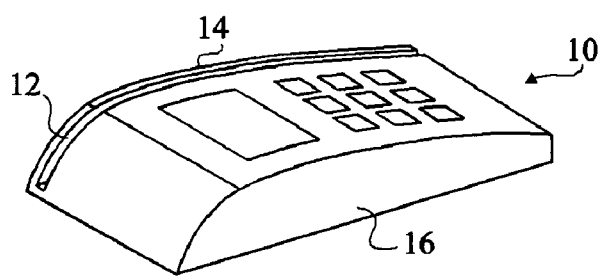
FIG. 1, previously described, schematically shows a conventional swipe reader.

For clarity, same elements have been designated with same reference numerals in the different drawings.

The present invention consists of a device for strengthening the bottom of a swipe reader slot, which is formed of a wire of substantially circular cross-section made of a low-friction coefficient wear-resisting material, for example, steel. On arranging the wire at the reader slot bottom level, the wire can then easily be deformed to adapt to the slot curvature.

Figure 3:
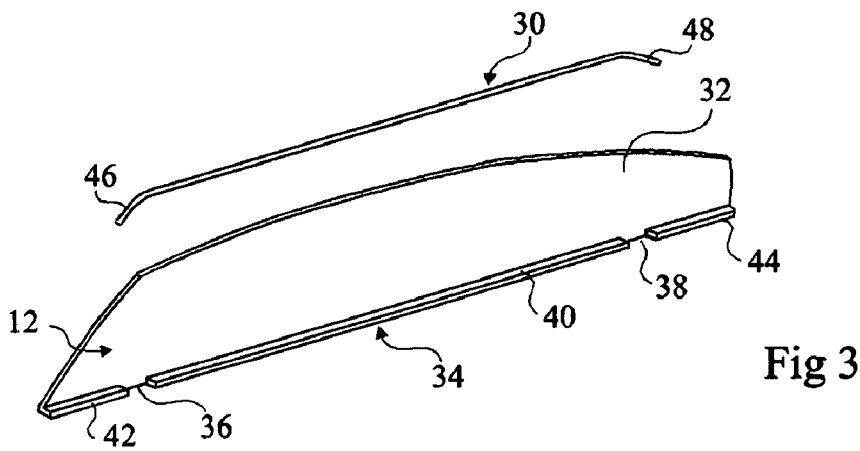
FIG. 3 shows an example of embodiment of a device according to the present invention for strengthening a swipe reader, the strengthening device being shown outside of the slot.

FIG. 3 shows an example of embodiment of strengthening device 30 according to the present invention and of elements of a swipe reader intended to receive such a device.

Figure 2:
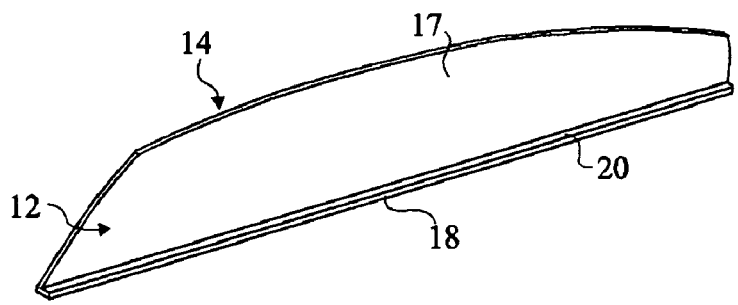
FIG. 2, previously described, schematically shows an example of embodiment of a device for strengthening the reader of FIG. 1.

Similarly to FIG. 2, slot 12 is, on one side, delimited by a lateral flange 32 and, on the other side, by parts, not shown, of the card reader. The bottom of slot 12 is delimited by a base 34, which in the shown example is solid with lateral flange 32. However, base 34 may correspond to a part distinct from flange 32. Two notches 36, 38 separate base 34 into a central portion 40 and two end portions 42, 44.

Strengthening device 30 is formed of a rectilinear wire of circular cross-section having inclined ends 46, 48. As an example, for a portable card reader, wire 30 may have a diameter on the order of one millimeter. The diameter of the strengthening wire substantially corresponds to the width of slot 12. Thus, when wire 30 is arranged in slot 12, it adapts to the shape of slot 12 under the action of the lateral walls delimiting slot 12.

Figure 4:
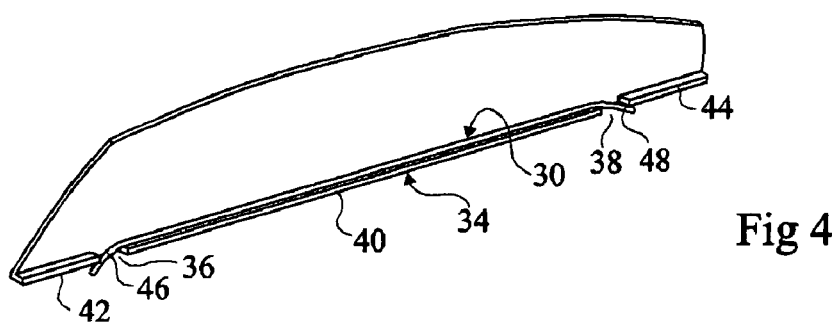
FIG. 4 shows the strengthening device of FIG. 3 assembled in the reader.

FIG. 4 shows strengthening device 30 according to the present example of embodiment assembled at the level of base 34 of slot 12. Inclined ends 46, 48 of wire 30 penetrate into notches 36, 38 of base 34. The assembly of wire 30 at the level of base 34 is performed by temporarily deforming wire 30 to have inclined ends 46, 48 penetrate into notches 36, 38. Wire 30 is then released. End portions 42, 44 then maintain ends 46, 48 in notches 36, 38 so that, once assembled, wire 30 cannot be removed without exerting a sufficient traction force thereon. On swiping of a card in slot 12, the card edge slides on wire 30, avoiding fast wearing of base 34.

Figure 5:
FIG. 5 shows an alternative embodiment of the strengthening device according to the present invention.

FIG. 5 shows an alternative embodiment of strengthening device 30. According to the present variation, the wire is, in the absence of any outer constraint, slightly curved between inclined ends 46, 48. The introduction of ends 46, 48 of wire 30 in notches 36, 38 then results in a deformation of the central portion of wire 30 so that, once assembled, all of wire 30 is pressed against base 34. Any play is thus eliminated between wire 30 and base 34.

Figure 6:
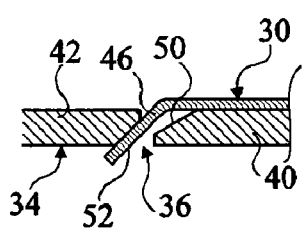
FIG. 6 shows a detail of the reader forming at the level of an end of the strengthening device.

FIG. 6 shows in more detailed fashion an alternative embodiment of notches 36, 38, only notch 36 being shown. Central portion 40 of base 34 comprises, at the level of notch 36, a tapered surface 50, oriented towards slot 12. End portion 42 of base 34 comprises, at the level of notch 36, a tapered surface 52 oriented towards the side opposite to slot 12. Tapered surface 50 guides inclined end 46 of wire 30 towards notch 36 on assembly of wire 30 on base 34. Further, when wire 30 is assembled, tapered surface 50 enables taking into account possible variations of the curvature of the rounded portion connecting inclined end 46 and central portion 40 of wire 30. Tapered surface 52 eases the maintaining of inclined end 46 in notch 36. Tapered surface 46 may further comprise a groove having a shape complementary to the shape of inclined end 46 of wire 30 to improve the maintaining in position of wire 30 once assembled on base 34.

The use of a strengthening device in the form of a cylindrical wire advantageously enables using the same strengthening device for different slot shapes, and in particular, for a slot which is not perfectly rectilinear but which has a slight curvature along the longitudinal slot direction.

Further, according to the previously-described example of embodiment, the inclined ends of the strengthening device form surfaces of "soft" triggering on swiping of a card in the slot. This advantageously enables limiting any card deterioration.

Moreover, according to the previously-described example of embodiment, the assembly of the strengthening device according to the present invention in a reader is particularly simple, since it is obtained by a slight temporary deformation of the wire to introduce the inclined wire ends in the corresponding notches provided at the base level.

Of course, the present invention is likely to have various alterations, modifications, and improvements which will readily occur to those skilled in the art. In particular, the attachment of the strengthening device to the base may be performed by other means, for example, by gluing.

The invention claimed is:

1. A device for strengthening a card reader comprising a slot at least partly delimited by a base and two lateral walls extending along a longitudinal direction, said slot being intended to receive a card moving along said longitudinal direction while an edge of the card bears on the base, the device comprising a wire of substantially circular cross-section, wherein the wire is disposed on the base, and on which the edge of the card is intended to slide.

2. The device of claim 1, wherein the lateral walls of the slot exhibit a curvature on an end opposite the base with respect to an axis perpendicular to said base.

3. The device of claim 1, wherein the diameter of the wire is substantially equal to the width of the slot, the width of the slot defined by the distance between the lateral walls.

4. The device of claim 1, wherein, before being disposed, the wire exhibits a curvature with respect to an axis transverse to the slot.

5. The device of claim 1, wherein the wire comprises two inclined ends and wherein the base comprises first and second notches receiving said inclined ends, wherein the notches separate The base into a central portion and two end portions such that the first notch and second notch are displaced longitudinally opposite one another on the base and the wire is disposed substantially the length of the central portion of the base.

6. The device of claim 5, wherein each notch comprises at least one tapered surface to ease at least one of the introduction and maintaining in said notch of the associated inclined end.

7. A card reader comprising a slot at least partly delimited by a base and two lateral walls and extending along a longitudinal direction, said slot being intended to receive a card moving along said longitudinal direction while bearing on the base, the reader comprising the strengthening device of claim 1.

8. A method for strengthening a card reader having a base configured to receive a card moving along a longitudinal direction while an edge of the card bears on the base, comprising:

disposing on said base a wire having a circular cross-section on which the edge of the card is intended to slide.

9. The method of claim 8, further comprising providing two lateral walls on either side of the base, the walls extending along the longitudinal direction thereby forming a slot that receives the card.

10. The method of claim 9, wherein the lateral walls forming the slot, on an end opposite the base, exhibit a curvature with respect to an axis perpendicular to the base.

11. The method of claim 9, wherein the diameter of the wire is substantially equal to the width of the slot defined by the distance between the lateral walls.

12. The method of claim 9, wherein, before being disposed, the wire exhibits a curvature with respect to an axis transverse to the slot.

13. The method of claim 8, wherein the step of providing a base further includes providing a base having two notches longitudinally opposite one another separating the base into a central portion and two end portions, and the step of disposing a wire on said base further comprises disposing a wire having deformable inclined ends, the inclined ends deformable to penetrate into The two notches and extend substantially the length of the central portion of the base and conform to the shape of the base.

14. The method of claim 13, wherein each notch comprises at least one tapered surface to ease the introduction and/or the maintaining in said notch of the associated inclined end.

15. A device for strengthening a card reader, the device comprising:
   a slot at least partially defined by a base and two lateral walls extending in a longitudinal direction, the slot configured to receive a card, and
   a wire of substantially circular cross-section having a first end and a second end disposed on the base and between said two lateral walls,
   wherein the wire is arranged generally parallel to an edge of the card received by the slot, the edge of the card intended to slide along the wire in the longitudinal direction from a first portion of the wire proximate the first end to a second portion of the wire proximate the second end.

* * * * *

UNITED STATES PATENT AND TRADEMARK OFFICE
CERTIFICATE OF CORRECTION

| | | |
|---|---|---|
| PATENT NO. | : 7,934,653 B2 | Page 1 of 1 |
| APPLICATION NO. | : 11/663471 | |
| DATED | : May 3, 2011 | |
| INVENTOR(S) | : Eric Dubois | |

It is certified that error appears in the above-identified patent and that said Letters Patent is hereby corrected as shown below:

Col. 4, line 28, the capitalized word "The" should read --the--

Col. 4, line 67, the capitalized word "The" should read --the--

Signed and Sealed this
Fourteenth Day of June, 2011

David J. Kappos
*Director of the United States Patent and Trademark Office*